(12) United States Patent
Nas

(10) Patent No.: US 9,185,510 B2
(45) Date of Patent: Nov. 10, 2015

(54) METHODS, SYSTEMS, AND COMPUTER READABLE MEDIA FOR MANAGING THE ROAMING PREFERENCES OF MOBILE SUBSCRIBERS

(75) Inventor: Petrus Wilhelmus Adrianus Jacobus Maria Nas, The Hague (NL)

(73) Assignee: TEKELEC, INC., Morrisville, NC (US)

(*) Notice: Subject to any disclaimer, the term of this patent is extended or adjusted under 35 U.S.C. 154(b) by 444 days.

(21) Appl. No.: 13/040,020

(22) Filed: Mar. 3, 2011

(65) Prior Publication Data

US 2011/0217979 A1    Sep. 8, 2011

Related U.S. Application Data

(60) Provisional application No. 61/310,248, filed on Mar. 3, 2010.

(51) Int. Cl.
*H04W 4/00* (2009.01)

(52) U.S. Cl.
CPC ........................... *H04W 4/00* (2013.01)

(58) Field of Classification Search
USPC ................... 455/432.1, 433, 435.1, 436–453, 455/456.1–456.3
See application file for complete search history.

(56) References Cited

U.S. PATENT DOCUMENTS

| | | | |
|---|---|---|---|
| 6,144,636 A | 11/2000 | Aimoto et al. | |
| 7,072,651 B2 | 7/2006 | Jiang et al. | |
| 8,305,922 B2 | 11/2012 | Cuervo | |
| 8,326,263 B2 | 12/2012 | Zhou et al. | |
| 8,331,229 B1 | 12/2012 | Hu et al. | |
| 8,335,220 B2 | 12/2012 | Hu et al. | |
| 8,353,000 B2 | 1/2013 | He et al. | |
| 8,400,916 B2 | 3/2013 | Cutler et al. | |
| 8,406,137 B2 | 3/2013 | Siddam et al. | |
| 8,438,290 B2 | 5/2013 | Rui et al. | |
| 8,543,118 B1 | 9/2013 | Mangal et al. | |
| 8,577,329 B2 | 11/2013 | Momtahan et al. | |
| 8,601,073 B2 | 12/2013 | Craig et al. | |
| 8,605,583 B2 | 12/2013 | Cutler et al. | |
| 8,626,156 B2 | 1/2014 | Marsico | |
| 8,630,925 B2 | 1/2014 | Bystrom et al. | |

(Continued)

FOREIGN PATENT DOCUMENTS

| EP | 0 857 399 B1 | 5/2004 |
|---|---|---|
| EP | 1 988 680 A1 | 11/2008 |

(Continued)

OTHER PUBLICATIONS

Communication of European Publication Number and Information on the Application of Article 67(3) EPC for European Patent Application No. 10841576.1 (Oct. 10, 2012).

Commonly-assigned, co-pending U.S. Appl. No. 61/671,691 for "Methods and System for Dynamically Controlling Signaling Costs in a Mobile Network," (Unpublished, filed Jul. 14, 2012).

Notificatino of Transmittal of the International Search Report and the Written Opinion of the International Searching Authority, or the Declaration for International Patent Application No. PCT/US2010/061586 (Sep. 26, 2011).

(Continued)

*Primary Examiner* — Dai A Phuong

(74) *Attorney, Agent, or Firm* — Jenkins, Wilson, Taylor & Hunt, P.A.

(57) ABSTRACT

According to one aspect, the subject matter described herein includes a method for managing the roaming preferences of a mobile subscriber. The method includes sending a preferred network roaming list to a mobile subscriber device. The method further includes sending a triggering message for terminating a PDP context link involving the mobile subscriber device and for activating the preferred network roaming list on the mobile subscriber device.

30 Claims, 10 Drawing Sheets

(56) References Cited

U.S. PATENT DOCUMENTS

| | | | |
|---|---|---|---|
| 8,675,487 B2 | 3/2014 | Siddam et al. | |
| 8,681,622 B2 | 3/2014 | Chatterjee et al. | |
| 8,683,544 B2 | 3/2014 | Foottit et al. | |
| 8,787,174 B2 | 7/2014 | Riley et al. | |
| 8,812,020 B2 | 8/2014 | Marsico | |
| 8,818,327 B2 | 8/2014 | Shaikh | |
| 2003/0003928 A1 | 1/2003 | Marjelund et al. | |
| 2004/0116117 A1 | 6/2004 | Ahvonen et al. | |
| 2005/0064889 A1* | 3/2005 | Haumont | 455/514 |
| 2005/0107091 A1 | 5/2005 | Vannithamby et al. | |
| 2005/0176438 A1* | 8/2005 | Li | 455/450 |
| 2005/0195743 A1 | 9/2005 | Rochberger et al. | |
| 2007/0054665 A1* | 3/2007 | Elkarat et al. | 455/432.1 |
| 2007/0153995 A1 | 7/2007 | Fang et al. | |
| 2007/0165599 A1* | 7/2007 | Skog et al. | 370/352 |
| 2007/0195788 A1 | 8/2007 | Vasamsetti et al. | |
| 2007/0232301 A1 | 10/2007 | Kueh | |
| 2008/0043689 A1 | 2/2008 | Walter | |
| 2008/0142599 A1 | 6/2008 | Benillouche et al. | |
| 2008/0153484 A1* | 6/2008 | Boni et al. | 455/433 |
| 2008/0159194 A1* | 7/2008 | Westman et al. | 370/310 |
| 2008/0205345 A1* | 8/2008 | Sachs et al. | 370/332 |
| 2009/0061855 A1* | 3/2009 | Sethi et al. | 455/432.2 |
| 2009/0109845 A1 | 4/2009 | Andreasen et al. | |
| 2009/0111458 A1* | 4/2009 | Fox et al. | 455/422.1 |
| 2009/0185494 A1 | 7/2009 | Li et al. | |
| 2009/0207730 A1 | 8/2009 | Stamoulis et al. | |
| 2009/0219946 A1 | 9/2009 | Liu et al. | |
| 2009/0225762 A1 | 9/2009 | Davidson et al. | |
| 2009/0228956 A1 | 9/2009 | He et al. | |
| 2009/0232019 A1 | 9/2009 | Gupta et al. | |
| 2009/0270099 A1 | 10/2009 | Gallagher et al. | |
| 2009/0325574 A1* | 12/2009 | Izawa et al. | 455/432.1 |
| 2010/0048161 A1 | 2/2010 | He et al. | |
| 2010/0080171 A1* | 4/2010 | Rune et al. | 370/328 |
| 2010/0091671 A1 | 4/2010 | Lidstrom et al. | |
| 2010/0121960 A1 | 5/2010 | Baniel et al. | |
| 2010/0190497 A1* | 7/2010 | Pudney et al. | 455/435.1 |
| 2010/0192170 A1 | 7/2010 | Raleigh | |
| 2010/0241496 A1 | 9/2010 | Gupta et al. | |
| 2010/0246500 A1* | 9/2010 | Rydnell et al. | 370/329 |
| 2010/0284278 A1 | 11/2010 | Alanara | |
| 2010/0287121 A1 | 11/2010 | Li et al. | |
| 2010/0291924 A1* | 11/2010 | Antrim et al. | 455/433 |
| 2010/0297985 A1 | 11/2010 | Van Erlach | |
| 2010/0299451 A1 | 11/2010 | Yigang et al. | |
| 2011/0035495 A1 | 2/2011 | Ekström et al. | |
| 2011/0067085 A1 | 3/2011 | Brouard et al. | |
| 2011/0076985 A1 | 3/2011 | Chami et al. | |
| 2011/0103261 A1* | 5/2011 | Duan | 370/254 |
| 2011/0116382 A1 | 5/2011 | McCann et al. | |
| 2011/0122886 A1 | 5/2011 | Willars et al. | |
| 2011/0138066 A1 | 6/2011 | Kopplin et al. | |
| 2011/0158090 A1 | 6/2011 | Riley et al. | |
| 2011/0165901 A1 | 7/2011 | Baniel et al. | |
| 2011/0171958 A1 | 7/2011 | Hua et al. | |
| 2011/0188457 A1 | 8/2011 | Shu et al. | |
| 2011/0199903 A1 | 8/2011 | Cuervo | |
| 2011/0225306 A1 | 9/2011 | Delsesto et al. | |
| 2011/0299395 A1 | 12/2011 | Maroblanca Nieves | |
| 2011/0307790 A1 | 12/2011 | Pandya et al. | |
| 2011/0317557 A1 | 12/2011 | Siddam et al. | |
| 2012/0014332 A1 | 1/2012 | Smith et al. | |
| 2012/0028626 A1 | 2/2012 | Marocchi et al. | |
| 2012/0039175 A1 | 2/2012 | Sridhar et al. | |
| 2012/0044867 A1 | 2/2012 | Faccin et al. | |
| 2012/0052866 A1 | 3/2012 | Froehlich et al. | |
| 2012/0057463 A1 | 3/2012 | Hurtta et al. | |
| 2012/0087368 A1 | 4/2012 | Kunarathnam et al. | |
| 2012/0094685 A1 | 4/2012 | Marsico | |
| 2012/0099438 A1 | 4/2012 | Wang et al. | |
| 2012/0099529 A1* | 4/2012 | Williams | 370/328 |
| 2012/0099715 A1 | 4/2012 | Ravishankar et al. | |
| 2012/0100849 A1 | 4/2012 | Marsico | |
| 2012/0115478 A1* | 5/2012 | Gunaratnam et al. | 455/435.2 |
| 2012/0131165 A1 | 5/2012 | Baniel et al. | |
| 2012/0140632 A1 | 6/2012 | Norp et al. | |
| 2012/0142311 A1 | 6/2012 | Rui et al. | |
| 2012/0155389 A1 | 6/2012 | McNamee et al. | |
| 2012/0176894 A1 | 7/2012 | Cai et al. | |
| 2012/0203781 A1 | 8/2012 | Wakefield | |
| 2012/0213072 A1 | 8/2012 | Kotecha et al. | |
| 2012/0215930 A1 | 8/2012 | Stenfelt et al. | |
| 2012/0221445 A1 | 8/2012 | Sharma | |
| 2012/0221693 A1 | 8/2012 | Cutler et al. | |
| 2012/0250573 A1 | 10/2012 | Kulasingam et al. | |
| 2012/0250613 A1 | 10/2012 | Robinson et al. | |
| 2012/0257499 A1 | 10/2012 | Chatterjee et al. | |
| 2012/0281617 A1* | 11/2012 | Bumiller | 370/315 |
| 2012/0290452 A1 | 11/2012 | Pancorbo Marcos et al. | |
| 2012/0303796 A1 | 11/2012 | Mo et al. | |
| 2013/0039176 A1 | 2/2013 | Kanode et al. | |
| 2013/0041994 A1 | 2/2013 | Terrien et al. | |
| 2013/0070594 A1 | 3/2013 | Garcia Martin et al. | |
| 2013/0079006 A1 | 3/2013 | Cho et al. | |
| 2013/0114404 A1 | 5/2013 | Yang | |
| 2013/0160058 A1 | 6/2013 | Albal et al. | |
| 2013/0163429 A1 | 6/2013 | Dunstan et al. | |
| 2013/0177146 A1 | 7/2013 | Schneider et al. | |
| 2013/0265911 A1 | 10/2013 | Kulaingam et al. | |
| 2013/0279401 A1 | 10/2013 | Sander et al. | |
| 2014/0011512 A1 | 1/2014 | Hu et al. | |
| 2014/0018067 A1 | 1/2014 | Rajagopalan et al. | |
| 2014/0022897 A1 | 1/2014 | Rajagopalan et al. | |
| 2014/0031029 A1 | 1/2014 | Rajagopalan et al. | |
| 2014/0040975 A1 | 2/2014 | Raleigh et al. | |
| 2015/0011182 A1 | 1/2015 | Goldner et al. | |

FOREIGN PATENT DOCUMENTS

| | | |
|---|---|---|
| EP | 2 093 931 A1 | 8/2009 |
| WO | WO 2009/058067 A1 | 5/2009 |
| WO | WO 2009/149341 A2 | 12/2009 |
| WO | WO 2011/082035 A2 | 7/2011 |
| WO | WO 2014/014823 A1 | 1/2014 |
| WO | WO 2014/014829 A1 | 1/2014 |
| WO | WO 2014/015331 A1 | 1/2014 |

OTHER PUBLICATIONS

3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).

"Smart Cards; Card Application Toolkit (CAT) (Release 9)," ETSI TS 102 223 V9.2.0, pp. 1-209 (Oct. 2010).

3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).

3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).

3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).

3GPP, Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9), ETSI TS 129 274 V9.3.0, pp. 1-162 (Jun. 2010).

(56) References Cited

OTHER PUBLICATIONS

3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE + ePC = EPS), IMS, PCC and SDM," Effort, pp. 1-229 (Part 1 of 2) (May 2010).
Znaty, "Diameter, GPRS, (LTE + ePC = EPS), IMS, PCC and SDM," Efort pp. 230-461 (Part 2 of 2) (May 2010).
"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct, 2008).
International Standard, "Maritime Navigation and Radiocommunication Equipment and Systems—Digital Interface—Part 1: Single Talker and Multiple Listeners," IEC 61662-1, Second edition, pp. 1-86, (Jul. 2010).
Non-Final Office Action for U.S. Appl. No. 13/251,784 (Oct. 10, 2013).
Advisory Action for U.S. Appl. No. 13/251,784 (Sep. 6, 2013).
Notice of Allowance and Fee(s) Due for U.S. Appl. No. 13/276,916 (Sep. 3, 2013).
Commonly-assigned, co-pending International Applicaton No. PCT/US13/51447 for "Methods, Systems and Computer Readable Media for Distributing Policy Rules to the Mobile Edge," (Unpublished, filed Jul. 22, 2013).
Commonly-assigned, co-pending U.S. Appl. No. 13/947,314 for "Methods, Systems and Computer Readable Media for Distributing Policy Rules to the Mobile Edge," (Unpublished, filed Jul. 22, 2013).
Commonly-assigned, co-pending International Applicaton No. PCT/US13/50512 for "Methods, Systems, and Computer Readable Media for Dynamically Controlling Congestion in a Radio Access Network," (Unpublished, filed Jul. 15, 2013).
Commonly-assigned, co-pending U.S. Appl. No. 13/942,323 for "Methods, Systems, and Computer Readable Media for Dynamically Controlling Congestion in a Radio Access Network," (Unpublished, filed Jul. 15, 2013).
Final Office Action for U.S. Appl. No. 13/251,784 (Jun. 26, 2013).
Final Office Action for U.S. Appl. No. 12/973,228 (Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12.1.0, pp. 1-68 (Jun. 2013).
Non-Final Office Action for U.S. Appl. No. 13/276,916 (Apr. 11, 2013).
Non-Final Office Action for U.S. Appl. No. 12/973,228 (Feb. 1, 2013).
Non-Final Office Action for U.S. Appl. No. 13/251,784 (Dec. 19, 2012).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Communication of extended European Search Report for European Patent Application No. 10841576.1 (May 9, 2014).

Notice of Allowance and Fee(s) Due for U.S. Appl. No. 12/973,228 (Mar. 20, 2014).
Notice of Allowance and Fee(s) Due for U.S. Appl. No. 13/251,784 (Feb. 12, 2014).
Notification of Transmittal of the International Search Report and the Written Opinion of the International Searching Authority, or the Declaration for International Application No. PCT/US2013/050512 (Dec. 2, 2013).
Notice of Allowance and Fee(s) Due for U.S. Appl. No. 13/330,086 (Nov. 6, 2013).
Notification of Transmittal of the International Search Report and the Written Opinion of the International Searching Authority, or the Declaration for International Application No. PCT/US2013/051447 (Oct. 28, 2013).
Non-Final Office Action for U.S. Appl. No. 12/973,228 (Oct. 25, 2013).
Final Office Action for U.S. Appl. No. 13/942,323 (Jun. 9, 2015).
Advisory Action Before the Filing of Appeal Brief and AFCP 2.0 Decision for U.S. Appl. No. 13/572,132 (Jun. 4, 2015).
Final Office Action for U.S. Appl. No. 13/942,205 (May 19, 2015).
Communication under Rule 71(3) EPC for European Patent Application No. 10841576.1 (May 7, 2015).
Notification of the Second Office Action for Chinese Patent Application No. 201080064945.X (Apr. 22, 2015).
Communication of European Publication Number and Information on the Application of Articale 67(3) EPC for European Patent Application No. 13819435.2 (Apr. 30, 2015).
Applicant-Initiated Interview Summary for U.S. Appl. No. 13/572,132 (Apr. 29, 2015).
Communication of European Publication Number and Information on the Application of Article 67(3) EPC for European Patent Application No. 13820508.3 (Apr. 22, 2015).
Communication of European Publication Number and Information on the Application of Article 67(3) EPC for European Patent Application No. 13819665.4 (Apr. 22, 2015).
Applicant-Initiated Interview Summary for U.S. Appl. No. 13/942,205 (Jan. 30, 2015).
Non-Final Office Action for U.S. Appl. No. 13/942,205 (Nov. 6, 2014).
Notification of Transmittal of the International Search Report and the Written Opinion of the International Searching Authority, or the Declaration for International Application No. PCT/US2012/050497 (Oct. 29, 2013).
Ye et al., "Enabling Local Breakout from eNB in LTE Network," 2012 IEEE International Conference on Communications (ICC), pp. 6982-6986 (Jun. 10-15, 2012).
"3rd Generation Partnership Project; Technical Specification Group Services and System Aspects; Local IP Access and Selected IP Traffic Offload (LIPA-SIPTO) (Release 10)," 3GPP TR 23.829, pp. 1-43 (Oct. 2011).
Balbás et al., "Policy and Charging Control in the Evolved Packet System," LTE—3GPP Release 8, IEEE Communications Magazine, pp. 68-74 (Feb. 2009).
Non-Final Office Action for U.S. Appl. No. 13/947,314 (Jan. 16, 2015).
Final Office Action for U.S. Appl. No. 13/572,156 (Dec. 29, 2014).
First Office Action for Chinese Application No. 201080064945.X (Sep. 17, 2014).
Non-Final Office Action for U.S. Appl. No. 13/572,132 (Aug. 11, 2014).
Non-Final Office Action for U.S. Appl. No. 13/572,156 (May 23, 2014).
Calhoun et al., "Diameter Base Protocol," RFC 3588, pp. 1-147 (Sep. 2003).
Notice of Allowance and Fee(s) Due and Interview Summary for U.S. Appl. No. 13/572,156 (Apr. 6, 2015).
Final Office Action for U.S. Appl. No. 13/572,132 (Mar. 11, 2015).
Non-Final Office Action for U.S. Appl. No. 13/942,323 (Feb. 25, 2015).

* cited by examiner

METHODS, SYSTEMS, AND COMPUTER READABLE MEDIA FOR MANAGING THE ROAMING PREFERENCES OF MOBILE SUBSCRIBERS

PRIORITY CLAIM

This application claims the benefit of U.S. Provisional Patent Application Ser. No. 61/310,248 filed Mar. 3, 2010, the disclosure of which is incorporated herein by reference in its entirety.

TECHNICAL FIELD

The subject matter described herein relates to the provisioning of preferred network roaming lists on mobile subscriber devices. More particularly, the subject matter described herein relates to methods, systems, and computer readable media for managing the roaming preferences of mobile subscribers.

BACKGROUND

With recent changes in usage behavior exhibited by roaming customers there is considerable incentive to provide roaming management (RM) services to high-end mobile customers that generate a large volume of data traffic. As general packet radio service (GPRS) networks and long term evolution (LTE) networks (e.g., 4G networks) afford more opportunities for mobile subscribers to access foreign networks, the management of individual mobile subscribers becomes a key consideration for network operators in terms of optimizing current roaming practices. Extremely active roamers, such as subscribers who use a personal digital assistant, a smartphone, or a comparable mobile device that requires a constant connection for certain data services (e.g., "push" electronic mail services), are not easily managed or controlled by current RM solutions.

Accordingly, there exists a need for methods, systems, and computer readable media for managing the roaming preferences of mobile subscribers.

SUMMARY

The subject matter described herein includes for methods, systems, and computer readable media for managing the roaming preferences of mobile subscribers. According to one aspect, the subject matter described herein comprises a method for managing the roaming preferences of a mobile subscriber that includes sending a preferred network roaming list to a mobile subscriber device, wherein the mobile subscriber device is communicating packet data with a remote server using a packet data protocol (PDP) context link via a communications network. The method further includes sending a signaling message that compels termination of the PDP context link and activates the preferred network roaming list on the mobile subscriber device.

According to another aspect, the subject matter described herein includes a system for managing the roaming preferences of a mobile subscriber. The system includes a communications interface. The system also includes a roaming management (RM) module for sending a preferred network roaming list to a mobile subscriber device, and for sending a triggering message that compels termination of the PDP context link and activates the preferred network roaming list on the mobile subscriber device.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
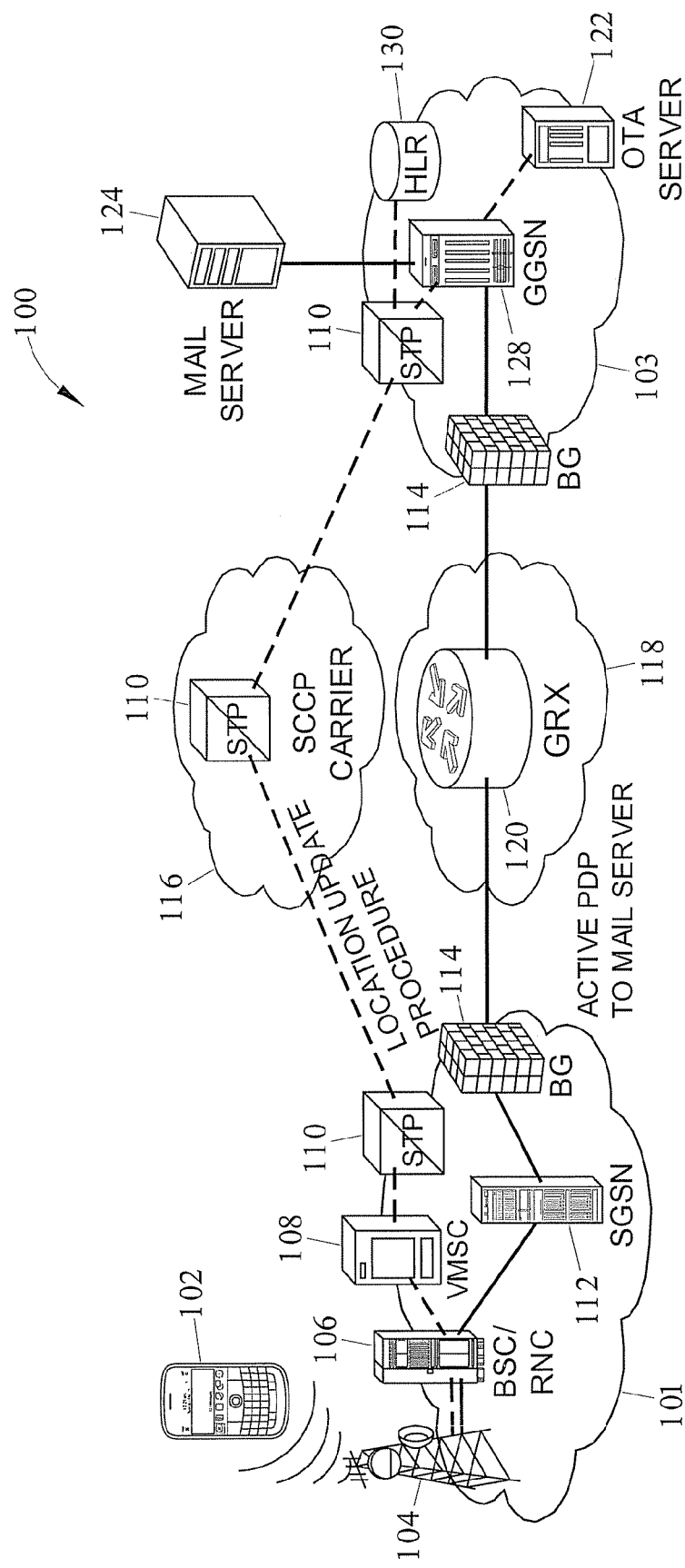
FIG. 1 is a block diagram illustrating an exemplary communications network for providing data services according to an embodiment of the subject matter described herein.

FIG. 1 is a block diagram illustrating an exemplary, communications network 100 for providing data services according to an embodiment of the subject matter described herein. Communications network 100 may include one or more networks, e.g., a universal mobile telecommunications system (UMTS) network, a global system for mobile communications (GSM) network, an LTE network, and a radio access network (RAN)). Communications network 100 may be associated with providing voice communications, data (e.g., videos, music, text, etc.), and other services (e.g., Internet connectivity). In one embodiment, communications network 100 may include or have access to a signaling system number 7 (SS7) network 116, a packet network 118, a visiting public land mobile network (VPLMN) 101 (also referred to herein as a foreign network) and a home public land mobile network (HPLMN) 103 (also referred to herein as a home network).

SS7 network 116 represents a signaling network for providing signaling messages between various locations, e.g., nodes and/or networks. SS7 network 116 may use various protocols, such as signaling connection control part (SCCP) and message transfer part (MTP), for communicating signaling messages. SS7 network 116 may include one or more signaling nodes, such as a signaling transfer point (STP) 110, for routing or relaying signaling messages. For example, location update messages or other signaling messages from VPLMN 101 may traverse SS7 network 116 using one or more STPs 110 and signaling links.

Packet network 118 represents an Internet protocol (IP) network for connecting various other networks associated with GPRS communications. Packet network 118 may include components, such as a GPRS roaming exchange (GRX) 120, for allowing a roaming MS 102 to connect to a home network for GPRS communications. For example, GRX 120 may use a GPRS tunneling protocol (GTP) for GPRS communications between VPLMN 101 and HPLMN 103.

VPLMN 101 represents a mobile network usable by a mobile device or mobile station (MS) 102 (e.g., a cell phone, a personal digital assistant (PDA), a smartphone, a computer, a pager, a modem, or other devices) for communicating with other MSs 102, nodes, and/or networks, including HPLMN 103. For example, VPLMN 103 may be associated with a service provider (e.g., AT&T) that is different from the service provider (e.g., Verizon) of MS 102. In such an example, the service providers may have roaming service agreements for allowing subscribers of one network to use the other's network while roaming or outside of their provider's coverage area.

VPLMN 101 may include a transceiver node 104, a base station controller and/or radio network controller (BSC/RNC) 106, a visited mobile switching center (VMSC) 108, STP 110 and/or other signaling nodes, a serving GPRS support node (SGSN) 112, and a border gateway (BG) 114. Transceiver node 104 (e.g., a base transceiver station (BTS), a node B or an enhanced node B (eNB)) may be any suitable entity for communicating with MS 102 via an air interface. BSC/RNC 106 may be any suitable entity for controlling transceiver node 104 and for provided related radio access functionality, such as radio resource management, mobility management functions, and encryption. VMSC 108 may be any suitable entity for providing mobility management and other services to MSs 102. In one embodiment, VMSC 108 may include a visitor location register for storing information about roaming subscribers. STP 110 and/or other signaling nodes may be used for communicating with SS7 network 116. SGSN 112 may be any suitable entity for delivering data packets from and to MSs 102 within its service area. BG 114 may be any suitable entity for communicating between networks. BG 114 may include interworking and/or security functionality, e.g., address translation and firewall capabilities.

HPLMN 103 represents a home mobile network associated with roaming MS 102. For example, HPLMN 103 may be associated with a service provider that the user of MS 102 has subscribed. HPLMN 103 may include a BG 114, STP 110 and/or other signaling nodes, an over the air (OTA) update server 122, a gateway GPRS support node (GGSN) 128, and an home location register (HLR) 130. OTA server may be any suitable entity for providing information, such as OTA updates, provisioning information, and preferred roaming network lists, to MS 102 and/or other nodes. GGSN 128 may be a gateway for communicating data packets between MS 102 and an external network (e.g., the Internet). For example, GGSN 128 may convert GPRS packets coming from SGSN 112 into IP packets and may send them to an Internet-based host. In this example, incoming data packets from the host may be received by GGSN 128 and may be converted for delivery to MS 102 via SGSN 112. HLR 130 may be any suitable entity for storing or maintaining information associated with mobile subscribers authorized to use HPLMN 103.

HPLMN 103 may also include or have access to a mail server 124. Mail server 124 may be any suitable entity for providing electronic mail or other communications. In one embodiment, mail server 124 may be located on the Internet or other network and may communicate email and/or related information to MS 102. Email and/or other data may be communicated to MS 102 using GTP via GPRS support nodes, e.g., GGSN 128, GRX 120, and SGSN 112. For example, email messages may be pushed or sent to MS 102 periodically or aperiodically. In another example, email messages may be pushed or sent to MS 102 when the email messages are received at mail server 124.

In one exemplary roaming scenario, a high value roaming mobile device subscriber may activate MS 102 (e.g., a PDA, a smartphone, a tablet, a cellular modem, etc.). In response to activating MS 102, MS 102 may attempt to register with one of the preferred networks listed in a preferred PLMN roaming list (also referred to herein to as a preferred network roaming list). As used herein, the term "preferred PLMN roaming list" or "preferred network roaming list" may refer to any entity (e.g., a data structure, list, database, message, etc.) for containing information associated with roaming preferences of a mobile subscriber (e.g., available networks and access related information for the user of MS 102). The preferred PLMN roaming list may be stored in MS 102 or in a component of MS 102. For example, MS 102 may include an identity module (IM), e.g., a universal subscriber identification module (USIM) or a subscriber identity module (SIM). The IM may include one or more processors and storage. For example, the IM may be a removable chip or a universal integrated circuit card (UICC). The IM (e.g., SIM) may be provisioned with a preferred PLMN roaming list by a network operator (e.g., via OTA update messages) or dynamically by OTA server 122 or other node.

In one embodiment, the preferred PLMN roaming list may be based on network service agreements, network conditions, cost, subscriber, phone capabilities, service plan, and/or other factors. The preferred PLMN roaming list may contain a listing of preferred VPLMNs that MS 102 may register with upon leaving HPLMN 103. The preferred PLMN roaming list may also include access technology information for indicating access technology of the networks. For example, a preferred PLMN roaming list of MS 102 may indicated that network 'A' uses W-CDMA technology and that network 'B' is uses GSM technology.

In one embodiment, MS 102 may register with VPLMN 101. Once successfully registered with VPLMN 101 (e.g., at VMSC 108), MS 102 may create a PDP context link to a remote server (e.g., electronic mail server 124). The remote server may provide a packet data protocol (PDP)-based service via a GPRS interface associated with VPLMN 101. In some cases where service requires a constant connection, the PDP context link may be active for 24 hours a day, e.g., to allow emails to be pushed to MS 102 in real time or on a frequent basis. In the event the PDP context link is deactivated, MS 102 may attempt to activate it again.

In one embodiment, the IM may contain a preferred PLMN roaming list that is customized for a particular subscriber profile (e.g., data optimized). For example, a smartphone user that browses video rich websites may be associated with a preferred PLMN roaming list that contains high-speed and/or low congestion networks. The preferred PLMN roaming list may also include a primary preference for HPLMN 103 based on practical and economic reasons. For example, the primary preference for HPLMN 103 may be based on the service area associated with the highest amount of usage for a subscriber (e.g., a PLMN closest to home or work).

In the event a preferred PLMN roaming list needs to be updated on the IM (e.g., new high speed networks are added), OTA server 122 in HPLMN 103 may be configured to send an updated preferred PLMN roaming list to the mobile subscriber device. This update procedure may occur while MS 102 is under HPLMN coverage, e.g., before MS 102 roams out of HPLMN 103.

In the event that the IM of MS 102 is not updated with the latest preferred PLMN roaming list while MS 102 is in HPLMN 103, signaling messages may be monitored to determine what foreign network MS 102 is roaming in and whether an active PDP context link has been established. For example, this process may involve a network monitoring node that is configured to monitor a link (e.g., a Gp link) existing between a GPRS roaming exchange (GRX) and GGSN 128 for location update information. In this example, the GPRS location update information may include a Mobile Application Part (MAP) update GPRS location message.

In one embodiment, if it is determined that MS 102 is utilizing a non-preferred VPLMN (e.g., VPLMN 101), OTA server 122 may attempt to send an updated preferred PLMN roaming list to MS 102. In such an embodiment, an updated preferred PLMN roaming list may provide MS 102 with the capability to switch to a preferred PLMN. For example, an updated preferred PLMN roaming list may include additional available networks that are preferable to the non-preferred VPLMN currently being utilized (e.g., by MS 102 while roaming).

In another embodiment, OTA server 122 may attempt to send an updated preferred PLMN roaming list to MS 102 regardless of which network MS 102 is currently utilizing. For example, an updated preferred PLMN roaming list may be sent to MS 102 whenever an updated preferred PLMN roaming list is compiled. In such an embodiment, an updated preferred PLMN roaming list may provide MS 102 with the capability to switch to a more preferred PLMN.

Typically, an OTA update (e.g., a preferred PLMN roaming list) that has been received and processed by MS 102 can only affect a PDP context change (e.g., connecting via a new access point in a new network) once the active PDP context link (e.g., the PDP data connection) is deactivated. Currently, there is no way to force MS 102 to immediately select and establish a PDP connection to the most preferred PLMN in a preferred PLMN roaming list during an active PDP context link. This RM issue can be even more prominent for an MS 102 that is configured to maintain a PDP context link with a remote server on a constant basis (e.g., 24 hours a day).

The subject matter described herein provides RM functionality that can compel a mobile subscriber device (e.g., MS 102) to terminate an active PDP context link (e.g., via an GSM network, GPRS network, UMTS network, LTE network, or other network), activate a preferred network roaming list on the mobile subscriber device, select a preferred PLMN from the preferred network roaming list, and/or establish a PDP connection via the preferred PLMN.

Figure 2:
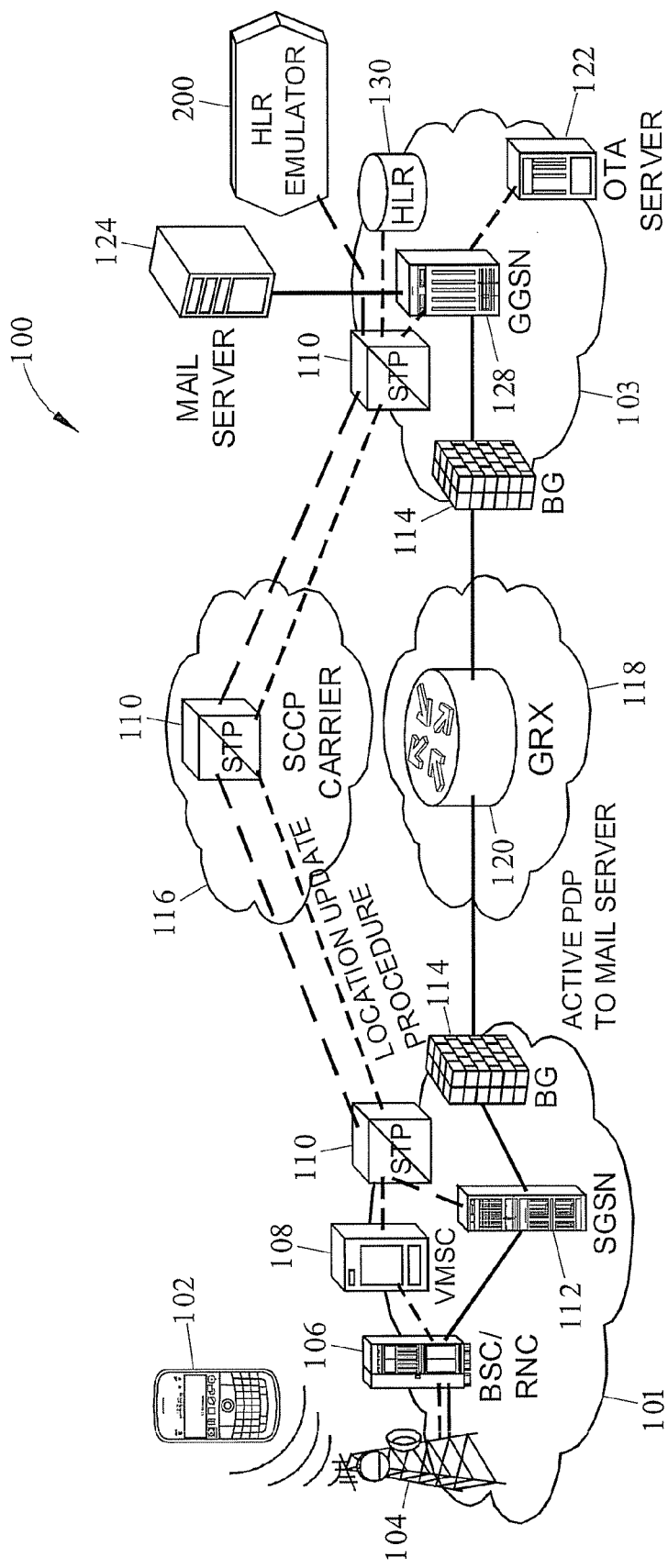
FIG. 2 is a block diagram illustrating an home location register (HLR) emulator for interrupting an active PDP context link according to an embodiment of the subject matter described herein.

FIG. 2 is a block diagram illustrating an HLR emulator functionality for interrupting an active PDP context link according to an embodiment of the subject matter described herein. Except as described herein, the network depicted in FIG. 2 is similar to the network described in reference to FIG. 1.

In this embodiment, one or more nodes (e.g., an HLR emulator 200) may include RM functionality for initiating MS 102 to process and act on preferred PLMN roaming list updates. For example, STP 110 may include an RM module. The RM module may include any RM functionality, or portions thereof, as described herein.

RM functionality may include functionality for interrupting or deactivating an active PDP context link. For example, an RM module or associated node may emulate HLR 130, GGSN 128, or other appropriate node in HPLMN 103 to a node in the foreign network serving MS 102, e.g., BSC/RNC 106 or VMSC 108 in VPLMN 101. In one embodiment, emulating a node may include sending communications that other entities perceived as coming from the node being emulated. For example, STP 110 may emulate HLR 130 by sending a message that includes address information identifying the sender as HLR 130. The node in the foreign network may receive such messages and act as if the messages were from the node being emulated.

HLR emulator 200 represents any suitable node, such as STP 110, OTA server 122, GGSN 128, or stand-alone node or computing platform, for emulating HLR 130 in HPLMN 103. HLR emulator 200 may send a message for deactivating an active PDP context link (also referred to herein as a PDP deactivation message). For example, a PDP deactivation message may include cancel location signaling message, an error message, a detach request message, a mobility management message, a registration message, an authorization message, or other message for deactivating an active PDP context link.

In one embodiment, HLR emulator 200 may send a PDP deactivation message (e.g., a cancel GPRS Location message) to VMSC 108 and/or BSC/RNC 106 serving MS 102 in VPLMN 101. The PDP deactivation message may cause or trigger the active PDP context link between MS 102 and mail server 124 (via SGSN 112 and GGSN 128) to deactivate. After the deactivation of the active PDP context, MS 102 may activate an updated preferred network roaming list on the mobile subscriber device that was previously received. Using the updated preferred network roaming list, MS 102 may attach or log onto a new, preferred VPLMN and may establish a new PDP context link by establishing a new active PDP context via the new, preferred VPLMN.

In one embodiment, interrupting or deactivating an active PDP context link may be triggered based on monitored signaling messages. For example, one or more signaling nodes, link probes, and/or other monitoring-capable computing platforms may examine messages, or copies thereof, that traverse network 100, or portions thereof (e.g., SS7 network 116). The examined messages may indicate the VPLMN being utilized (e.g., by MS 102 while roaming).

In one embodiment, if information regarding the subscriber or MS 102 (e.g., an international mobile equipment identity (IMEI) value or international mobile station identifier (IMSI)) is available, a PDP deactivation message may be triggered in response to determining that the VPLMN currently being utilized by MS 102 is non-preferred or less preferred than other available PLMNs for MS 102. That is, in such an embodiment, RM module and/or associated node may access a preferred PLMN roaming list associated with MS 102, e.g., an updated preferred PLMN roaming list that is delivered but not yet applied at MS 102. The RM module and/or associated node may determine, using information contained in the preferred PLMN roaming list, whether a more appropriate VPLNM is available for use. If a more appropriate VPLMN is available for use, RM module and/or associated node may initiate sending a PDP deactivation message to one or more nodes in a currently utilized VPLMN. The PDP deactivation message may be from or may appear to be from HLR 130.

In one embodiment, a timer and/or threshold may be used in determining whether to trigger a PDP deactivation message. For example, if information regarding the subscriber or MS 102 is unavailable, a duration of an active PDP context link may be observed for a threshold to be exceeded (e.g., 8 hours). In another example, an active PDP context link and/or device activity may be observed for a threshold associated with data usage and/or other criteria (e.g., 80 minutes of calls, 100 text messages, lack of user generated output (e.g., text messages, outgoing calls, etc.) for 4 hours, 1 GB of total data used, 750 MB of video data viewed, or 250 MB of email data used). In response to a threshold being exceeded, RM module and/or associated node may initiate sending a PDP deactivation message to one or more nodes in a currently utilized VPLMN. The PDP deactivation message may be from or may appear to be from HLR 130. For example, a monitoring node (e.g., STP 110) may send a trigger message that triggers HLR 130 to generate a PDP deactivation message (e.g. a cancel GPRS location message). In some instances, a trigger message may include a PDP deactivation message, or a portion thereof. In a second example, a STP 110 may generate and send a PDP deactivation message that appears to come from HLR 130 to the currently utilized VPLMN associated with MS 102.

Figure 3:
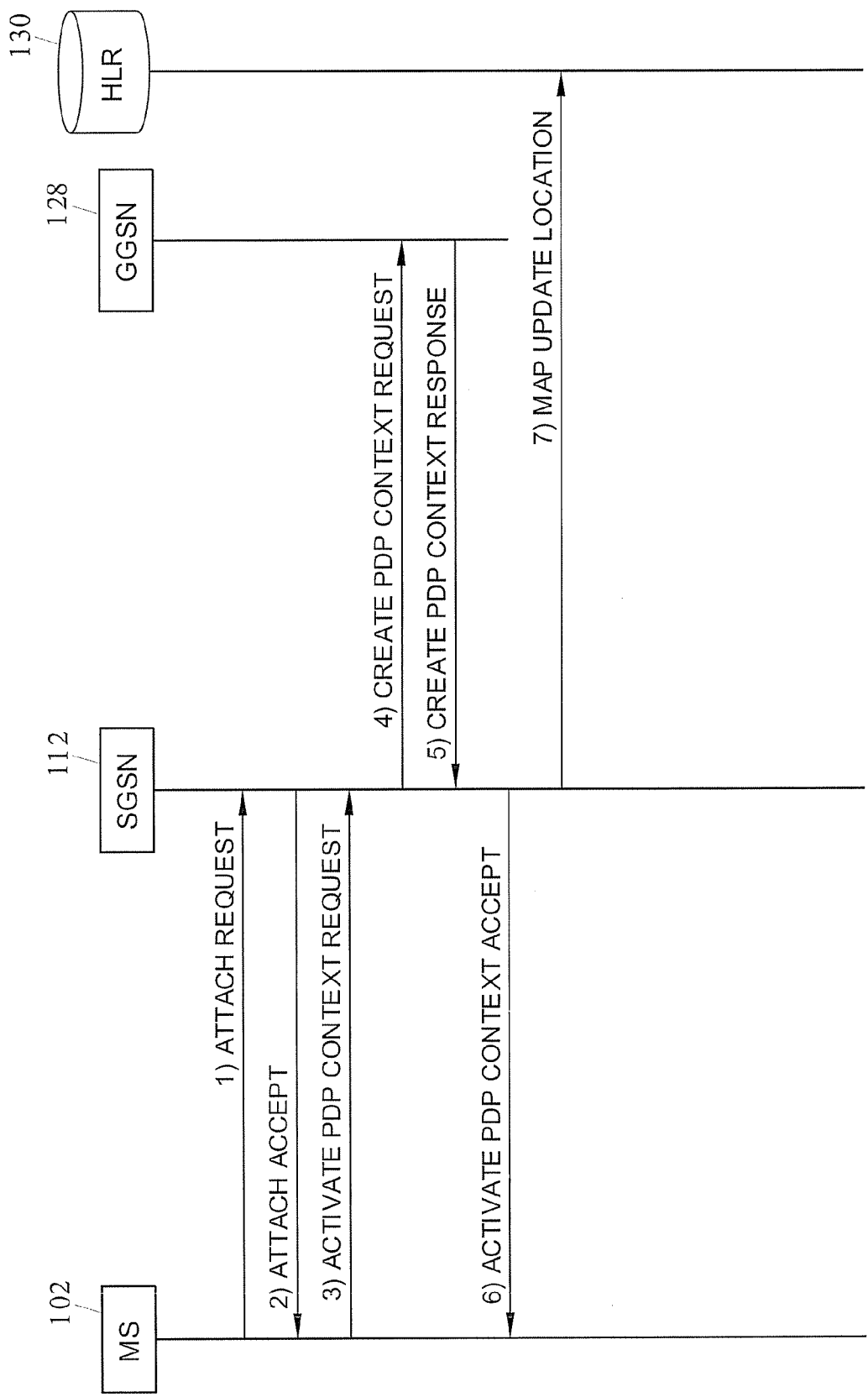
FIG. 3 is a signaling flow diagram illustrating a GPRS attach and PDP context activation according to an embodiment of the subject matter described herein.

FIG. 3 is a signaling flow diagram illustrating a GPRS attach and PDP context activation according to an embodiment of the subject matter described herein. Except as described herein, the nodes of FIG. 3 are essentially the same as described in reference to FIG. 1.

In this embodiment, a preferred network roaming list may be provisioned on an IM of MS 102. MS 102 may roam into VPLMN 101 (e.g., a foreign network) or may be powered up in VPLMN 101. MS 102 may access the preferred network roaming list and may attempt to select a preferred VPLMN that can provide data service to MS 102. If such a VPLMN exists, MS 102 may select the preferred VPLMN from the list for its data communications purposes and conducts the registration process. If a preferred data VPLMN from the list is not accessible, MS 102 may register with an available (i.e., non-preferred) VPLMN, e.g., VPLMN 101.

Referring to FIG. 3, at step 1, an attach request is sent to SGSN 112 from MS 102. The attach request may be a GPRS mobility management (GMM) attach message for attaching to VPLMN 101 for receiving GPRS data services. The GMM attach message may include an identifier (e.g., a temporary mobile subscriber identifier (TMSI)) for authentication, authorization, and/or accounting (AAA) purposes. SGSN 112 may receive the attach request, determine MS 102 identity, and perform AAA functions. In one embodiment, SGSN 112 may inform HLR 130 of the attachment of MS 102 to VPLMN 101 via signaling messages, before sending a response indicating that the attach request is accepted.

At step 2, an attach accept message may be sent to MS 102 from SGSN 112. The attach accept message may be a GMM attach accept message for indicating that MS 101 is registered with VPLMN 101. After MS 102 is registered with VPLMN 101, MS 102 may attempt to activate a PDP context. For example, MS 102 may activate a PDP context for receiving an IP address such that communications (e.g., email messages) may occur with hosts (e.g., mail server 124) in external packet networks. At step 3, an activate PDP context request message may be sent to SGSN 112 from MS 102. The activate PDP context request message may include information, such as an access point name (APN), for identifying GGSN 128. SGSN may receive the activate PDP context request message and may identify GGSN 128, e.g., using a domain name server (DNS).

At step 4, in response to receiving the activate PDP context request message at SGSN 112, a create PDP context request message may be sent to GGSN 128 from SGSN 112. The create PDP context request message may include information for authenticating MS 102 or associated subscriber. GGSN 128 may receive the create PDP context request message and determine whether to create a PDP context for MS 102. In response to determining to create a PDP context for MS 102, GGSN 128 may determine or request (e.g., from a dynamic host configuration protocol (DHCP) server) an IP address for MS 102. At step 6, a create PDP context response may be sent to SGSN 112 from GGSN 128. The create PDP context response may indicate the status of the create PDP context activation. For example, if the create PDP context activation is successful, the create PDP context response may include an IP address for use by MS 102 and/or other related information for use during the active PDP context link.

At step 7, after activating a PDP context, a MAP update location message (which indicates that MS 102 is roaming) may be sent to HLR 130 in HPLMN 103. HLR 130 may store or maintain information in the received location update message associated with MS 102. In one embodiment, HLR 130 or other node may use the location update message or related information to determine whether MS 102 is utilizing an appropriate VPLMN.

Figure 4:
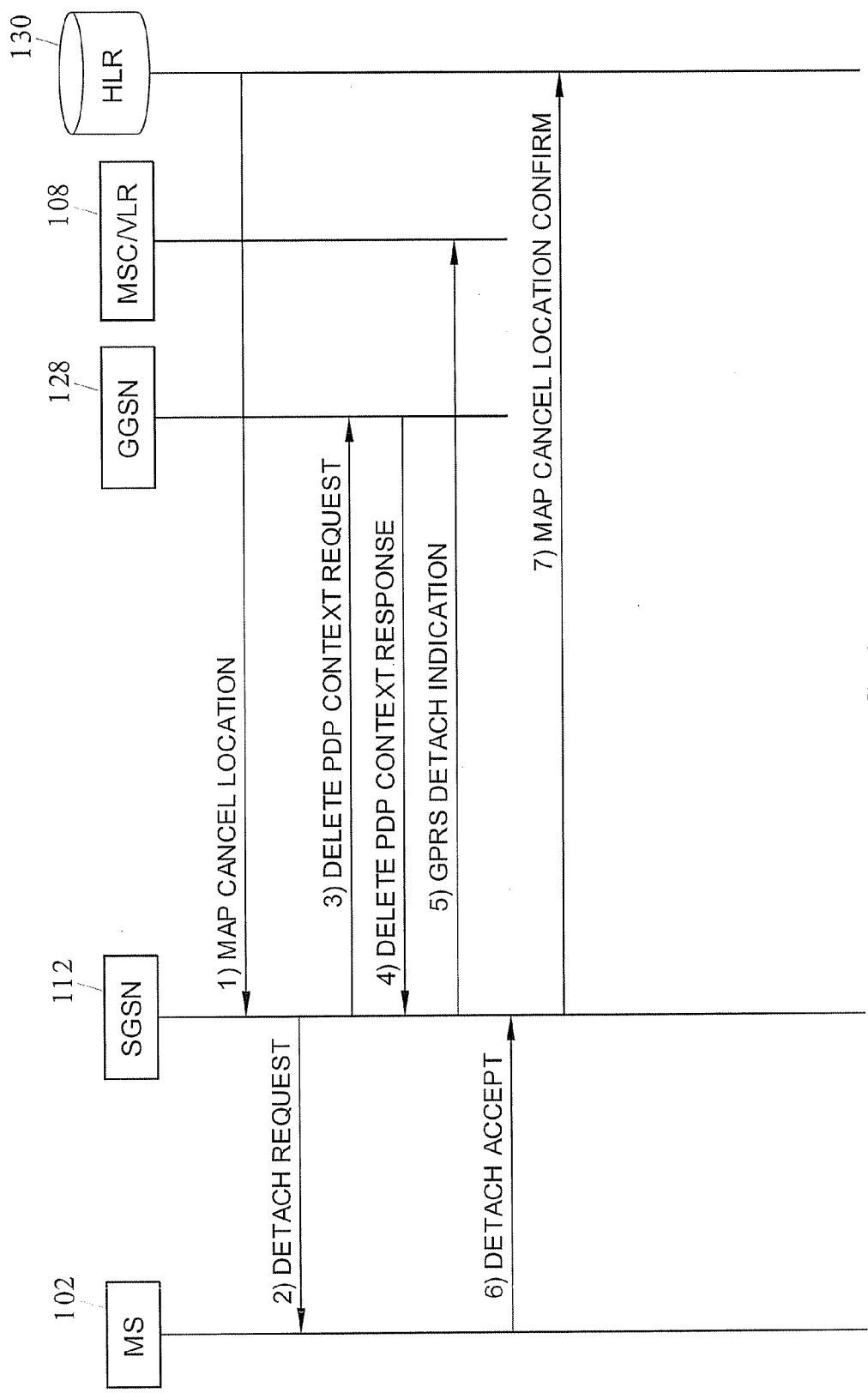
FIG. 4 is a signaling flow diagram illustrating a GPRS detach and a PDP context deactivation according to an embodiment of the subject matter described herein.

FIG. 4 is a signaling flow diagram illustrating a GPRS detach and a PDP context deactivation according to an embodiment of the subject matter described herein. Except as described herein, the nodes of FIG. 4 are essentially the same as described in reference to FIG. 1. In this embodiment, MSC/VLR 108 may be VMSC 108 that includes VLR functionality.

Referring to FIG. 4, at step 1, a MAP cancel location message may be sent to SGSN 112 from HLR 130. In an alternate embodiment, a MAP cancel location message may be sent to SGSN 112 from an HLR emulator 200 and may appear to come from HLR 130.

In response to receiving a MAP cancel location message, SGSN 112 may initiate a GPRS detach procedure and a PDP context deactivation procedure. At step 2, a detach request may be sent to MS 102 from SGSN 102. The detach request may be a GMM detach request for disconnecting or de-registering from VPLMN 101. At step 3, in response to initiate a GPRS detach procedure, a delete PDP context request message may be sent to GGSN 128 from SGSN 112. GGSN 128 may receive the delete PDP context request message and determine whether to delete the PDP context for MS 102. At step 4, a delete PDP context response may be sent to SGSN 112 from GGSN 128. The delete PDP context response may indicate the status of the PDP context deactivation.

At step 5, a GPRS detach indication message may be sent to MSC/VLR 108. The GPRS detach indication message may indicate to MSC/VLR 108 that MS 102 is disconnecting from VPLMN 101 and that information associated with MS 102 may be purged at MSC/VLR 108. At step 6, a detach accept message may be sent to SGSN 112 from MS 102. The detach accept message may be a GMM detach accept message for indicating that MS 102 accepts detachment from VPLMN 101. At step 7, a MAP cancel location confirmation message may be sent to HLR 130 from SGSN 112. The MAP cancel location confirmation message may indicate that SGSN 112 is no longer serving MS 102.

Figure 5A:
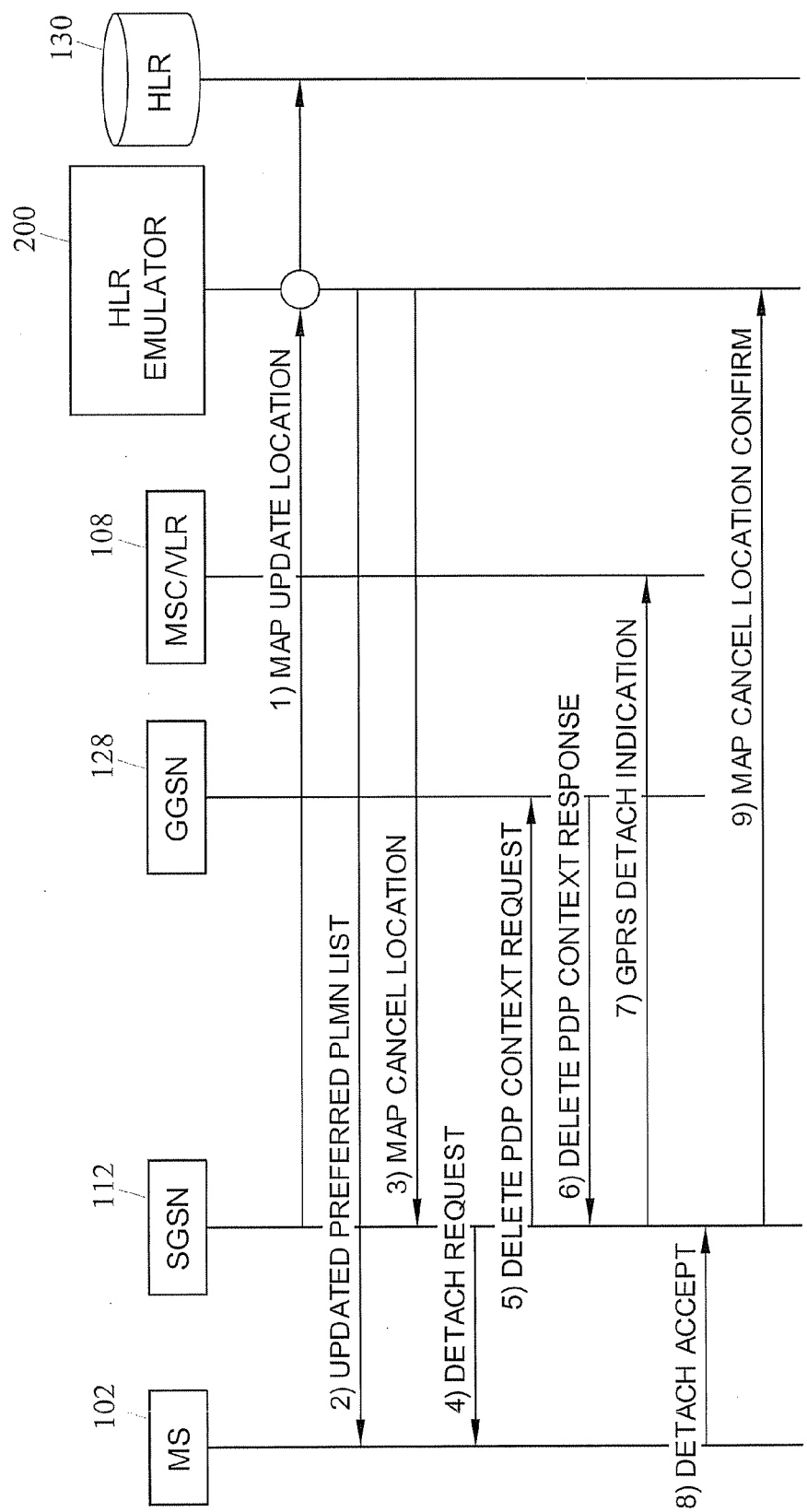
FIG. 5A is a first portion of a signaling flow diagram illustrating managing the roaming preferences of a mobile subscriber according to an embodiment of the subject matter described herein.
Figure 5B:
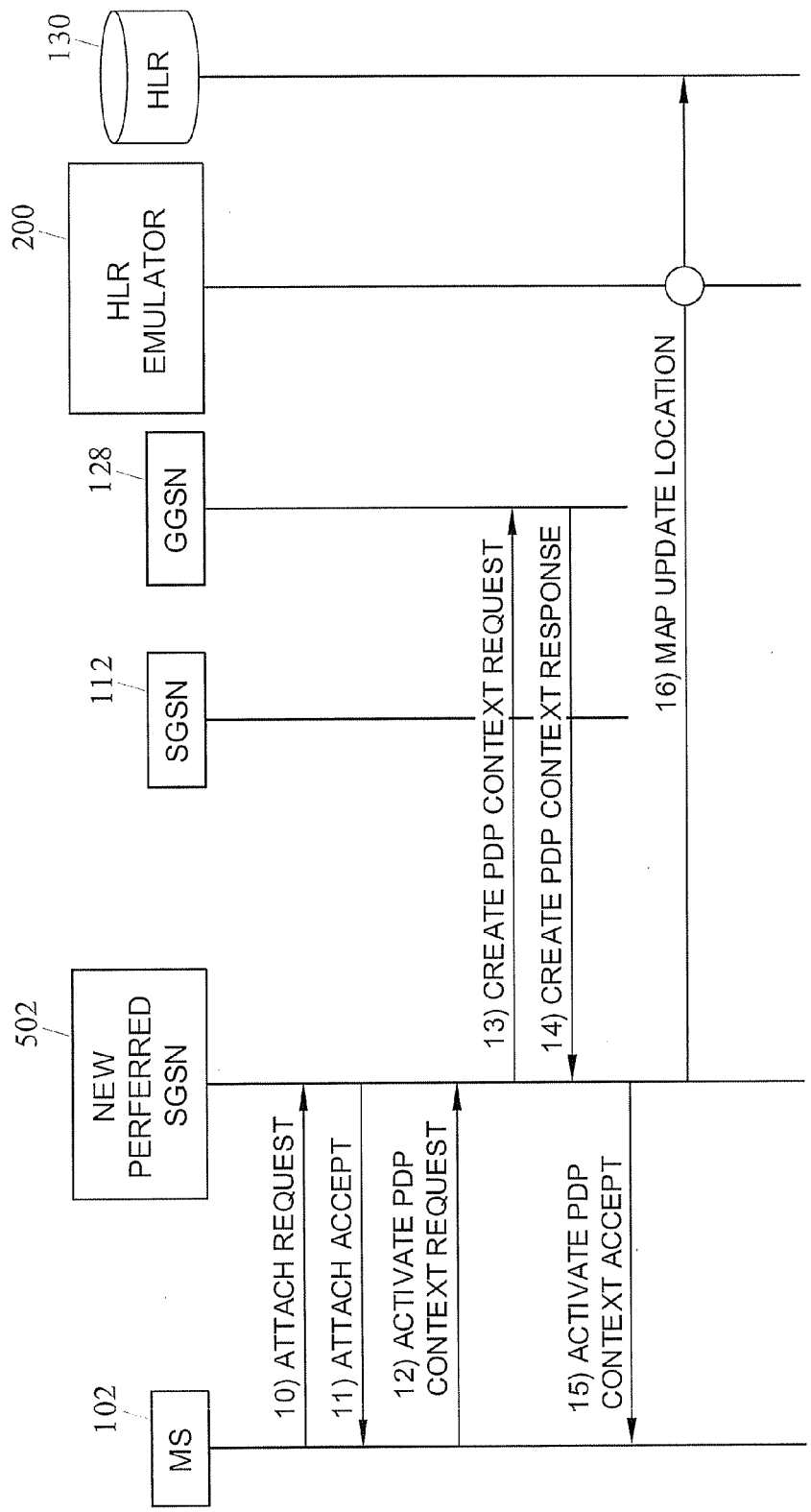
FIG. 5B is a second portion of a signaling flow diagram illustrating managing the roaming preferences of a mobile subscriber according to an embodiment of the subject matter described herein.

FIGS. 5A-B are portions of a signaling flow diagram illustrating managing the roaming preferences of a mobile subscriber according to an embodiment of the subject matter described herein. Except as described herein, the nodes of FIGS. 5A-B are essentially the same as described in reference to FIGS. 1 and 4. In this embodiment, HLR emulator 200 may include an RM module. For example, HLR emulator 200 may monitor signaling messages, initiate OTA updates, and/or initiate an MS 102 to process and act on OTA updates.

Referring to FIG. 5A, MS 102 may be associated with a high value mobile subscriber that maintains an active PDP context link on a constant basis, e.g., 24 hours per day. At step 1, after registering with VPLMN 101, a signaling message (e.g., a MAP update location message) may be sent to HPLMN 103 from SGSN 112. The signaling message may traverse HLR emulator 200, e.g., before reaching HLR 130, and may indicate that MS 102 is roaming in VPLMN 101. HLR Emulator 200 and/or RM module may determine that VPLMN 101 is a non-preferred (or less preferred) network. For example, HLR emulator 200 may match a VPLMN identifier found in the signaling message with an entry in a database containing identifiers of non-preferred networks associated with a particular MS 102.

At step 2, in response to determining that VPLMN 601 is a non-preferred (or less preferred) network, HLR Emulator 200 and/or RM module may send an updated preferred network roaming list to be provisioned on the IM in MS 102. HLR Emulator 200 and/or RM module may also provide a PDP deactivation message for triggering MS 102 to disconnect from VPLMN 101 and connect to a preferred VPLMN using the updated preferred network roaming list.

At step 3, HLR Emulator 200 and/or RM module may send a PDP deactivation message (e.g., a MAP cancel location message) to SGSN 112 serving MS 102. The PDP deactivation message may appear to be from HLR 130.

Steps 4-8 of FIG. 5A are essentially the same as corresponding steps 2-6 of FIG. 4. At step 7, a MAP cancel location confirmation message may be sent to HLR Emulator 200 and/or RM module from SGSN 112. The MAP cancel location confirmation message may indicate that SGSN 112 is no longer serving MS 102. In one embodiment, the MAP cancel location confirmation message or a related message may be sent to HLR 130 from HLR Emulator 200 and/or RM module.

Referring to FIG. 5B, steps 10-16 of FIG. 5B are essentially the same as corresponding steps 1-7 of FIG. 3. However, in the embodiment illustrated in FIGS. 5A-B, MS 102 uses the updated preferred network roaming list of step 2 in selecting a preferred VPLMN. Further, the MAP cancel location confirmation message of step 16 may traverse HLR Emulator 200 and/or RM module, e.g., before reaching HLR 130.

Figure 6:
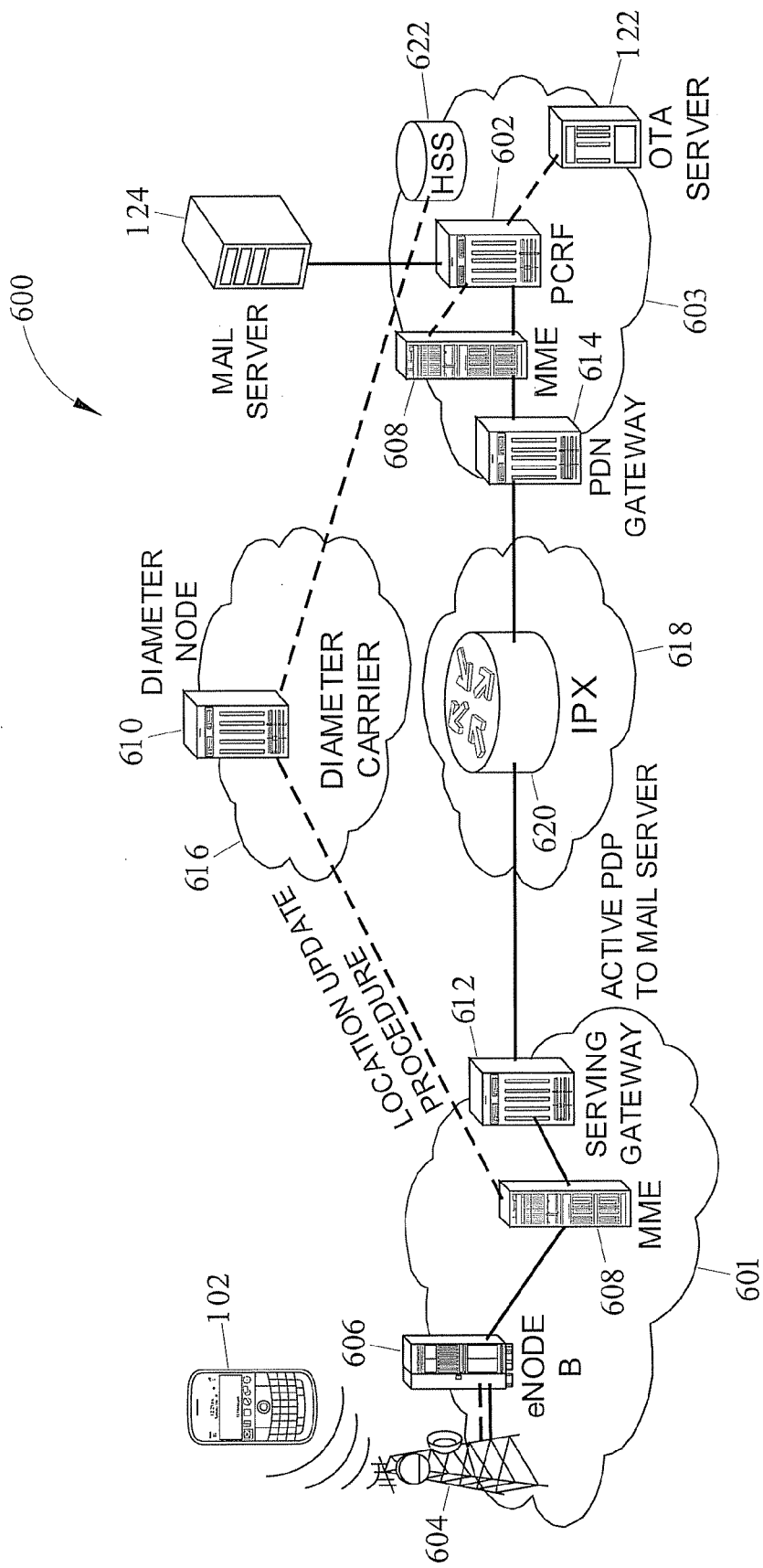
FIG. 6 is a block diagram illustrating an exemplary long term evolution (LTE) communications network for providing data services according to an embodiment of the subject matter described herein.

FIG. 6 is a block diagram illustrating an exemplary communications network 600 for providing data services according to an embodiment of the subject matter described herein. Communications network 600 may include one or more networks associated with providing voice communications, data (e.g., email messages), and other services (e.g., Internet connectivity). In one embodiment, communications network 600 may include or have access to a Diameter network 616 and a packet network 618.

Diameter network 616 represents a signaling network for providing signaling messages between various locations, e.g., nodes and/or networks. Diameter network 616 may use or implement a Diameter protocol for communicating Diameter signaling messages (e.g., mobility management messages). Diameter network 616 may include one or more Diameter nodes 610. For example, a Diameter node 610 may comprise a mobility management entity (MME), a home subscriber server (HSS) and/or authentication, authorization, and accounting (AAA) server, a Bearer Binding and Event Reporting Function (BBERF), a policy charging enforcement function (PCEF), a policy charging and rules function (PCRF), a subscriber profile repository (SPR), a serving gateway (SGW), a packet data network (PDN) gateway, a Diameter peer node, a Diameter agent, a network node, a policy engine, a policy server, an application function (AF), an application server, a Diameter signaling agent, an LTE node, an IP multimedia subsystem (IMS) network node, a server, a node, a database, a computing platform, or a Diameter signaling router (DSR) for routing or relaying Diameter signaling messages. For example, Diameter location update messages or other Diameter signaling messages from VPLMN 601 may traverse Diameter network 616 using one or more Diameter nodes 610 (e.g., DSRs) and signaling links.

Packet network 618 represents an IP network for connecting various other networks for packet data communications (e.g., voice, video, and/or text communications). Packet network 618 may include components, such as an IP roaming exchange (IPX) 620, for allowing a roaming MS 102 to connect to a home network (e.g., HPLMN 603) for packet data communications. For example, GTP or other tunneling protocol (e.g., proxy mobile IP (PMIP)) may be used to allow packet communications between a foreign network or VPLMN 601 and a home network or HPLMN 603 via IPX 620.

In some embodiments, Diameter network 616 and packet network 618 may be discrete networks. In other embodiments, Diameter network 616 and/or packet network 618 may represent portions of another network that perform particular functions (e.g., an evolved packet core (EPC) network, HPLMN 603, or VPLMN 601).

VPLMN 601 represents an LTE mobile network usable by a mobile device or MS 102 for communicating with other MSs 102, nodes and/or networks, including a HPLMN 603. VPLMN 601 may include a transceiver node 604, an eNB 606, an MME 608, and a SGW 612. Transceiver node 604 and/or eNB 606 may be any suitable entity for communicating with MS 102 via an LTE air interface and may include related radio access functionality, such as radio resource management and encryption. MME 608 may be any suitable entity for providing mobility management and other services to MS 102. For example, MME 106 may track MS 102 and may communicate mobility-related information (e.g., location update messages) to other nodes in network 600. MME 108 may include a database for storing information about roaming subscribers. MME 108 may also be used in bearer activation and deactivation process and for authenticating MS 102 with an HSS 622, e.g., using Diameter signaling message via Diameter node 610. SGW 112 may be any suitable entity for routing and/or forwarding data packets from and to MSs 102 within its service area.

HPLMN 603 represents an LTE mobile network associated with roaming MS 102. For example, HPLMN 603 may be associated with a service provider that the user of MS 102 has subscribed. HPLMN 603 may include a PDN gateway 614, an MME 108, an OTA update server 122, a PCRF 602, and an HSS 622. PDN gateway 614 may be any suitable entity for communicating data packets between MS 102 and an external network (e.g., the Internet). For example, PDN gateway 614 may communicate with a remote server, e.g., mail server 124 and provide communications to MS 102, e.g., via SGW 612. PDN gateway 614 may also be a PCEF and may enforce policies and charging rules among other things. PCRF 602 may be any suitable entity (e.g., a policy server) for determining policy and charging control (PCC) rules and/or for providing the PCC rules to a PCEF or other nodes. HSS 622 may be any suitable entity for storing or maintaining information associated with mobile subscribers authorized to use HPLMN 603.

In one exemplary roaming scenario, a high value roaming mobile device subscriber may activate MS 102. In response to activating MS 102, MS 102 may attempt to register with one of the preferred networks listed in a preferred PLMN roaming list. The preferred PLMN roaming list may be stored in MS 102, or a portion therein. For example, MS 102 may include an identity module (IM), e.g., a USIM or a SIM. The IM may include one or more processors and storage. For example, the IM may be a removable chip or UICC. The IM may be provisioned with a preferred PLMN roaming list by a network operator or dynamically by OTA server 122 or other node.

In one embodiment, the preferred PLMN roaming list may be based on network service agreements, network conditions, cost, subscriber, phone capabilities, service plan, and/or other factors. The preferred PLMN roaming list may contain a listing of preferred VPLMNs that MS 102 may register with upon leaving HPLMN 603. The preferred PLMN roaming list may also include access technology information for indicating access technology of the networks. For example, a preferred PLMN roaming list of MS 102 may indicated that network 'A' uses LTE technology.

MS 102 may register with VPLMN 601 via MME 608. Once successfully registered with VPLMN 601, MS 102 may create a PDP context link to a remote server (e.g., electronic mail server 124). For example, SGW 612 may communicate with PDN gateway In some instances, the PDP context link may be active for 24 hours a day, e.g., to allow emails to be pushed to MS 102 in real time or on a frequent basis. In the event the PDP context link is deactivated, MS 102 may attempt to activate it again.

In the event a preferred PLMN roaming list needs to be updated on the IM (e.g., new high speed networks are added), OTA server 122 in HPLMN 603 may be configured to send an updated preferred PLMN roaming list to the mobile subscriber device. This update procedure may occur while MS 102 is under HPLMN coverage, e.g., before MS 102 roams out of HPLMN 603.

In the event that the IM of MS 102 is not updated with the latest preferred PLMN roaming list while MS 102 is in HPLMN 603, signaling messages may be monitored to determine what foreign network MS 102 is roaming in and whether an active PDP context link has been established. For example, this process may involve a Diameter node 610 that is configured to monitor a Diameter link (e.g., a S6a interface link) existing between an MME 608 and HSS 602 for location update information.

In one embodiment, if it is determined that MS 102 is utilizing a non-preferred VPLMN (e.g., VPLMN 601), OTA server 122 may attempt to send an updated preferred PLMN roaming list to MS 102. In another embodiment, OTA server 122 may attempt to send an updated preferred PLMN roaming list to MS 102 regardless of which network MS 102 is currently utilizing.

Typically, an OTA update (e.g., a preferred PLMN roaming list) that has been received and processed by MS 102 can only affect a PDP context change once the active PDP context link (e.g., the PDP data connection) is deactivated. The present subject matter described herein provides RM functionality that can compel a mobile subscriber device (e.g., MS 102) to terminate an active PDP context link (e.g., via an LTE network), activate a preferred network roaming list on the mobile subscriber device, select a preferred PLMN from the preferred network roaming list, and/or establish a PDP connection via the preferred PLMN.

Figure 7:
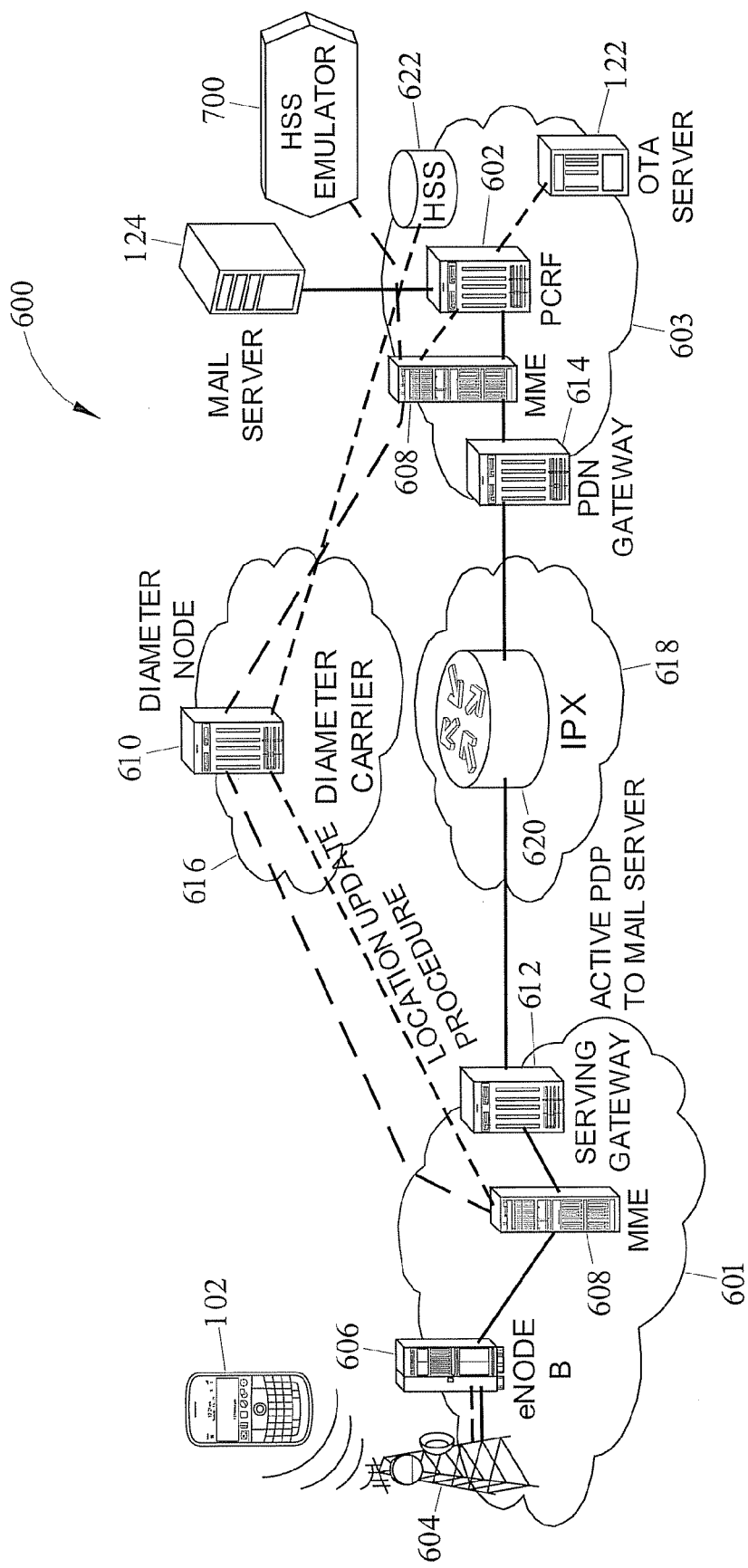
FIG. 7 is a block diagram illustrating an home subscriber server (HSS) emulator for interrupting an active PDP context link according to an embodiment of the subject matter described herein.

FIG. 7 is a block diagram illustrating an HSS emulator 700 for interrupting an active PDP context link according to an embodiment of the subject matter described herein. Except as described herein, the network depicted in FIG. 7 is similar to the network described in reference to FIG. 6.

In this embodiment, one or more nodes (e.g., HSS emulator 700) may include RM functionality for initiating MS 102 to process and act on preferred PLMN roaming list updates. For example, Diameter node 610 (e.g., a DSR or message processor therein) may include an RM module. The RM module may include any RM functionality, or portions thereof, as described herein.

RM functionality may include functionality for interrupting or deactivating an active PDP context link. For example, an RM module or associated node may emulate HSS 622, MME 608, PCRF 602, PDN gateway 614, or other appropriate node in HPLMN 603 to a node in the foreign network serving MS 102, e.g., MME 608 in VPLMN 601. In one embodiment, emulating a node may include sending communications that other entities perceived as coming from the node being emulated. For example, Diameter node 610 may emulate HSS 622 by sending a message that includes address information identifying the sender as HSS 622. The node in the foreign network may receive such messages and act as if the messages were from the node being emulated.

Referring to FIG. 7, an HSS emulator 700 represents any suitable node, such as Diameter node 610, OTA server 122, MME 608, and HSS 622, for emulating HSS 622 in HPLMN 603. HSS emulator 700 may send a message for deactivating an active PDP context link (also referred to herein as a PDP deactivation message). For example, a PDP deactivation message may include cancel location signaling message, an error message, a detach request message, a mobility management message, a registration message, an authorization message, or other message for deactivating an active PDP context link.

In one embodiment, HSS emulator 700 may send a PDP deactivation message (e.g., a cancel location signaling message) to MME 608A and/or eNB 606 serving MS 102 in VPLMN 601. The PDP deactivation message may cause or trigger the active PDP context link between MS 102 and mail server 124 (via SGW 612 and PDN gateway 614) to deactivate. After the deactivation of the active PDP context, MS 102 may activate an updated preferred network roaming list on the mobile subscriber device that was previously received. Using the updated preferred network roaming list, MS 102 may attach or log onto a new, preferred VPLMN and may establish a new PDP context link by establishing a new active PDP context via the new, preferred VPLMN.

In one embodiment, interrupting or deactivating an active PDP context link may be triggered based on monitored signaling messages. For example, one or more signaling nodes, link probes, and/or other monitoring-capable computing platforms may examine messages (e.g., Diameter signaling messages), or copies thereof, that traverse network 100, or portions thereof (e.g., Diameter network 616). The examined messages may indicate the VPLMN being utilized (e.g., by MS 102 while roaming).

In one embodiment, if information regarding the subscriber or MS 102 (e.g., an IMEI value or an IMSI value) is available, a PDP deactivation message may be triggered in response to determining that the VPLMN currently being utilized by MS 102 is non-preferred or less preferred than other available PLMNs for MS 102. That is, in such an embodiment, RM module and/or associated node may access a preferred PLMN roaming list associated with MS 102, e.g., an updated preferred PLMN roaming list that is delivered but not yet applied at MS 102. The RM module and/or associated node may determine, using information contained in the preferred PLMN roaming list, whether a more appropriate VPLNM is available for use. If a more appropriate VPLMN is available for use, RM module and/or associated node may initiate sending a PDP deactivation message to one or more nodes in a currently utilized VPLMN. The PDP deactivation message may be from or may appear to be from HSS 622.

In one embodiment, a timer and/or threshold may be used in determining whether to trigger a PDP deactivation message. For example, if information regarding the subscriber or MS 102 is unavailable, a duration of an active PDP context link may be observed for a threshold to be exceeded (e.g., 8 hours). In another example, an active PDP context link and/or device activity may be observed for a threshold associated with data usage and/or other criteria. In response to a threshold being exceeded, RM module and/or associated node may initiate sending a PDP deactivation message to one or more nodes in a currently utilized VPLMN. The PDP deactivation message may be from or may appear to be from HSS 622. For example, a trigger message may be sent from a monitoring node (e.g., Diameter node 610) that triggers HSS 622 to generate the PDP deactivation message. In some instances, a trigger message may include a PDP deactivation message, or a portion thereof. In a second example, Diameter node 610 may generate and send a PDP deactivation message that appears to come from HSS 622 to the currently utilized VPLMN associated with MS 102.

Figure 8:
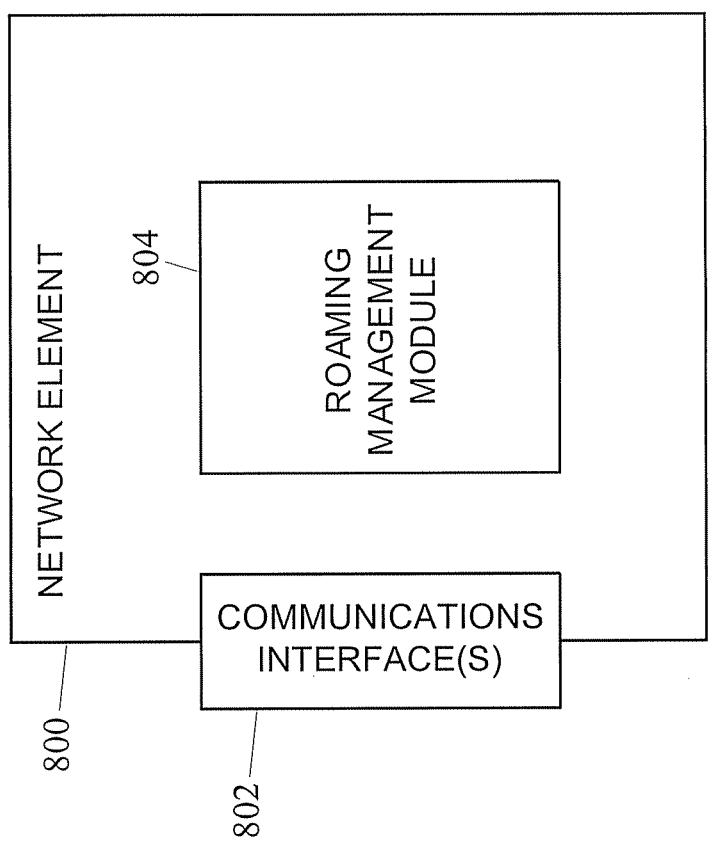
FIG. 8 is a block diagram illustrating an exemplary network element for managing the roaming preferences of a mobile subscriber according to an embodiment of the subject matter described herein.

FIG. 8 is a block diagram illustrating an exemplary network element 800 for managing the roaming preferences of a mobile subscriber according to an embodiment of the subject matter described herein. Network element 800 may represent any node, or component therein (e.g., a processor), for performing functionality described herein associated with managing the roaming preferences of mobile subscribers. For example, network element 800 may be a node, e.g., STP 110 or Diameter node 610, in communication networks 100 or communications network 600. In some embodiments, network element 800 may be a component of a node. For example, a DSR may include multiple network elements 800. In such an embodiment, each network element 800 may be a message processor that includes RM functionality as described herein.

Referring to the embodiment illustrated in FIG. 8, network element 800 may include one or more communications interfaces 802 for communicating external and/or internal messages. For example, network element 800 may send and receive Diameter messages between external entities (e.g., MMEs 608A-B and HSS 622) via external interfaces 802. Network element 800 may also send and receive messages (e.g., Diameter messages and other messages) between internal entities via internal interfaces 802. For example, where network elements 800 comprise message processors in Diameter node 610 (e.g., a DSR), a first network element 800 may monitor a signaling link for location update messages and may notify, via an internal interlace 802, a second network element 800 to initiate RM procedures, e.g., sending a trigger message to compel PDP deactivation by MS 102.

As stated above, network element 800 may include or have access to an RM module 804. RM module 804 may include any functionality described herein associated with managing the roaming preferences of mobile subscribers. In an embodiment having distributed architecture (e.g., where network elements 800 comprise message processors in Diameter node 610), network elements 800 may include functionality for handling particular messages. For example, RM module 804 at a first network element 800 may examine messages associated with an LTE-based VPLNMN 601 and RM module 804 at a second network element 800 may examine messages associated with a GPRS-based VPLNMN 101.

Network element 800 and/or RM module 804 may include or have access to one or more databases, such as an RM rules database. RM rules database may include any suitable data structure for storing or maintaining policies and/or rules associated with RM functionality. For example, rules databases may include RM policies and/or rules for determining whether and/or when an updated preferred PLMN roaming list should be sent to a mobile subscriber device and whether and/or when to trigger a mobile subscriber device to deactivate a current PDP context link.

Figure 9:
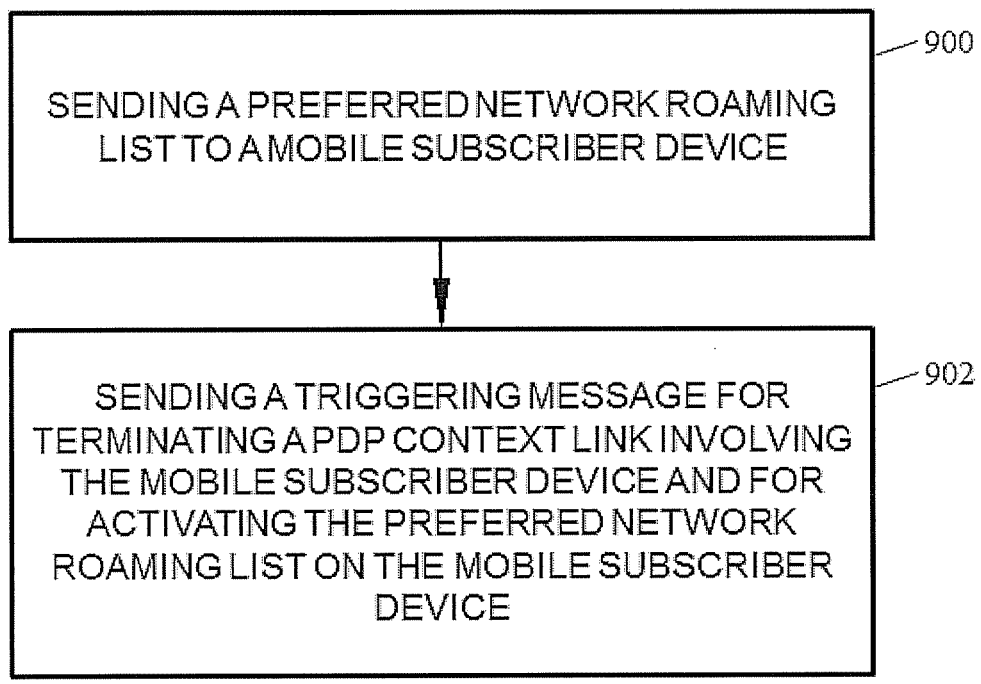
FIG. 9 is a flow chart illustrating exemplary steps for managing the roaming preferences of a mobile subscriber according to an embodiment of the subject matter described herein.

FIG. 9 is a flow chart illustrating exemplary steps for managing the roaming preferences of a mobile subscriber according to an embodiment of the subject matter described herein. In this embodiment, one or more exemplary steps described herein may be performed at or performed by a network element 800. Network element 800 may comprise a node or component therein. For example, a network element 800 may comprise an STP 110 or Diameter node 610. In another example, one or more exemplary steps described herein may be performed at or performed by one or more components in Diameter node 610 (e.g., message processors in a DSR).

Referring to the embodiment illustrated in FIG. 9, at step 900, a preferred network roaming list may be sent to a mobile subscriber device. The mobile subscriber device may be communicating packet data with a remote server using a packet data protocol (PDP) context link via a communications network. For example, a smartphone (e.g., MS 102) may maintain a constant PDP context link (e.g., a 24 hour a day connection) with an electronic mail server (e.g., mail server 124) for receiving email messages. In another example, a mobile subscriber device (e.g., MS 102) may maintain a constant PDP context link (e.g., a 24 hour a day connection) with a server for receiving Internet-based messages (e.g., Twitter® messages).

In one embodiment, sending the preferred network roaming list to the mobile subscriber device is in response to detecting that the mobile subscriber device is roaming in a foreign network (e.g., VPLMN 601) and determining that the foreign network is a non-preferred foreign network. For example, network element 800 may examine a location update signaling message associated with MS 102 from a network element in the foreign network and determine, using a data structure containing preferred VPLMNs associated with MS 102, that the current VPLMN is non-preferred.

At step 702, a signaling message (e.g., a triggering message) may be sent for terminating a PDP context link involving the mobile subscriber device and for activating the preferred network roaming list on the mobile subscriber device. For example, network element 800 may be an HSS emulator 700 and may send a LTE detach request towards MME 608A, eNB 606, and/or MS 102. In response to receiving the LTE detach request, a mobile subscriber device (e.g., MS 102) or other node may terminate an active PDP context link (e.g., via an LTE network). The mobile subscriber device may activate a preferred network roaming list on the mobile subscriber device, select a preferred PLMN from the preferred network roaming list, connect to the preferred VPLMN, and establish a PDP connection via the preferred PLMN.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for managing roaming preferences of a mobile subscriber, the method comprising:
   at a network node distinct from a mobile subscriber device:
      in response to determining that a foreign network, to which the mobile subscriber device is attached to and with which the mobile subscriber device has established a packet data protocol (PDP) context link, is a non-preferred network, sending, from the network node distinct from the mobile subscriber device, a preferred network roaming list to the mobile subscriber device; and
      after sending the preferred network roaming list to the mobile subscriber device, sending, from the network node distinct from the mobile subscriber device, a triggering message for terminating the PDP context link involving the mobile subscriber device and wherein the trigger message is also for activating the preferred network roaming list on the mobile subscriber device, wherein terminating the PDP context link involving the mobile subscriber device includes detaching the mobile subscriber from the non-preferred network.

2. The method of claim 1 wherein sending the preferred network roaming list to the mobile subscriber device is in response to:
   detecting that the mobile subscriber device is roaming in the foreign network.

3. The method of claim 2 wherein the foreign network includes a long term evolution (LTE) network.

4. The method of claim 2 wherein the foreign network includes a general packet radio service (GPRS) network.

5. The method of claim 1 wherein a packet data includes non-voice packet data.

6. The method of claim 1 wherein detecting that the mobile subscriber is roaming in the foreign network includes detecting a location update signaling message from a network element in the foreign network.

7. The method of claim 6 wherein determining that the foreign network is a non-preferred foreign network includes matching a foreign network identifier in the location update signaling message with an entry in a database containing non-preferred foreign network identifiers.

8. The method of claim 1 wherein the triggering message triggers a home location register (HLR) or a home subscriber server (HSS) to send a location cancellation message to a node serving the mobile subscriber device.

9. The method of claim 1 wherein sending the triggering message includes sending a location cancellation message to a node serving the mobile subscriber device.

10. The method of claim 9 wherein the location cancellation message appears to be from a home location register (HLR) or a home subscriber server (HSS).

11. The method of claim 1 wherein sending the triggering message includes enabling the mobile subscriber device to re-establish the PDP context link with a remote server via a preferred foreign network that is listed in the preferred network roaming list.

12. The method of claim 11 wherein the remote server includes an electronic mail server.

13. The method of claim 1 wherein the PDP context link is active on a constant basis.

14. The method of claim 1 wherein the steps are performed by a Diameter signaling router (DSR), a signaling transport point (STP), an update server, a node, a computing platform, or a message processor.

15. The method of claim 1 wherein sending the preferred network roaming list to a mobile subscriber device is performed by an update server and sending the triggering message is performed by a Diameter signaling router (DSR), a signaling transport point (STP), a node, a computing platform, or a message processor.

16. A system for managing roaming preferences of a mobile subscriber, the system comprising:
   at a network node distinct from a mobile subscriber device:
      a communications interface; and
      a roaming management (RM) module for sending, from the network node distinct from the mobile subscriber device and in response to determining that a foreign network, to which the mobile subscriber device is attached to and with which the mobile subscriber device has established a packet data protocol (PDP) context link, is a non-preferred network, a preferred network roaming list to the mobile subscriber device and for sending, from the network node distinct from the mobile subscriber device and after sending the preferred network roaming list to the mobile subscriber device, a triggering message for terminating the PDP context link involving the mobile subscriber device and wherein the trigger message is also for activating the preferred network roaming list on the mobile subscriber device, wherein terminating the PDP context link involving the mobile subscriber device includes detaching the mobile subscriber from the non-preferred network.

17. The system of claim 16 wherein the RM module is configured to send the preferred network roaming list to the mobile subscriber device in response to:
   detecting that the mobile subscriber device is roaming in the foreign network.

18. The system of claim 17 wherein the foreign network includes a long term evolution (LTE) network.

19. The system of claim 17 wherein the foreign network includes a general packet radio service (GPRS) network.

20. The system of claim 16 wherein detecting that the mobile subscriber is roaming in the foreign network includes detecting a location update signaling message from a network element in the foreign network.

21. The system of claim 20 wherein determining that the foreign network is a non-preferred foreign network includes matching a foreign network identifier in the location update signaling message with an entry in a database containing non-preferred foreign network identifiers.

22. The system of claim 16 wherein the triggering message triggers a home location register (HLR) or a home subscriber server (HSS) to send a location cancellation message to a node serving the mobile subscriber device.

23. The system of claim 16 wherein sending the triggering message includes sending a location cancellation message to a node serving the mobile subscriber device.

24. The method of claim 23 wherein the location cancellation message appears to be from a home location register (HLR) or a home subscriber server (HSS).

25. The system of claim 16 wherein sending the triggering message includes enabling the mobile subscriber device to re-establish the PDP context link with a remote server via a preferred foreign network that is listed in the preferred network roaming list.

26. The system of claim 25 wherein the remote server includes an electronic mail server.

27. The system of claim 16 wherein the PDP context link is active on a constant basis.

28. The system of claim 16 wherein the system comprises a Diameter signaling router (DSR), a signaling transport point (STP), an update server, a node, a computing platform, or a message processor.

29. The system of claim 16 wherein sending the preferred network roaming list to a mobile subscriber device is performed at an update server and sending the triggering message is performed at a Diameter signaling router (DSR), a signaling transport point (STP), a node, a computing platform, or a message processor.

30. A non-transitory computer readable medium having stored thereon executable instructions that when executed by the processor of a computer control the computer to perform steps comprising:
- at a network node distinct from a mobile subscriber device:
  - in response to determining that a foreign network, to which the mobile subscriber device is attached to and with which the mobile subscriber device has established a packet data protocol (PDP) context link, is a non-preferred network, sending, from the network node distinct from the mobile subscriber device, a preferred network roaming list to the mobile subscriber device; and
  - after sending the preferred network roaming list to the mobile subscriber device, sending, from the network node distinct from the mobile subscriber device, a triggering message for terminating the PDP context link involving the mobile subscriber device and wherein the trigger message is also for activating the preferred network roaming list on the mobile subscriber device, wherein terminating the PDP context link involving the mobile subscriber device includes detaching the mobile subscriber from the non-preferred network.

* * * * *